(12) United States Patent
Pascoe et al.

(10) Patent No.: US 11,153,391 B2
(45) Date of Patent: Oct. 19, 2021

(54) CONNECTING APPLICATION INSTANCES TO CLIENT DEVICES

(71) Applicant: HEWLETT PACKARD ENTERPRISE DEVELOPMENT LP, Houston, TX (US)

(72) Inventors: Travis Pascoe, Boise, ID (US); Timothy Mosier, Boise, ID (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/778,054

(22) Filed: Jan. 31, 2020

(65) Prior Publication Data

US 2021/0243261 A1    Aug. 5, 2021

(51) Int. Cl.
G06F 15/16    (2006.01)
H04L 29/08    (2006.01)
H04L 29/06    (2006.01)

(52) U.S. Cl.
CPC ........ *H04L 67/146* (2013.01); *H04L 65/1069* (2013.01)

(58) Field of Classification Search
CPC .......................... H04L 67/146; H04L 65/1069
USPC ...................................................... 709/227
See application file for complete search history.

(56) References Cited

U.S. PATENT DOCUMENTS

| 8,521,860 | B2 | 8/2013 | Prahalad et al. |
| 10,051,046 | B1* | 8/2018 | Zacharski ............... H04L 67/14 |
| 10,430,217 | B2 | 10/2019 | Cheng et al. |
| 2012/0254396 | A1* | 10/2012 | Prahalad ................ H04L 43/04 709/224 |
| 2015/0088978 | A1* | 3/2015 | Motukuru ............... H04L 67/02 709/203 |
| 2019/0238598 | A1* | 8/2019 | Mohamad Abdul ........................ H04L 63/0807 |

OTHER PUBLICATIONS

Evidian, "Heartbeat, Failover and Quorum in a Windows or Linux Cluster," retrieved online Oct. 22, 2019, https://www.evidian.com/products/high-availability-software-for-application-clustering/heartbeat-failover-quorum-windows-linux-aix-cluster/.
Microsoft, "Database Mirroring Witness," Mar. 14, 2017, https://does.microsoft.com/en-us/sql/database-engine/database-mirroring/database-mirroring-witness?view=sql-server-ver15.

(Continued)

*Primary Examiner* — Suraj M Joshi
*Assistant Examiner* — Jaren Means
(74) *Attorney, Agent, or Firm* — Hewlett Packard Enterprise Patent Department

(57) ABSTRACT

Example implementations relate to passing a cookie between client devices such that, based on the cookie, connections to the application from the client devices are mapped to a given application instance. A request may be transmitted to an application instance connector to connect to an application. The application may be implemented by multiple application instances. A cookie associated with a given application instance of the multiple application instances may be received from the application instance connector. The cookie may cause connections to the application from client devices having the cookie to map to the given application instance. The cookie may be passed from a first client device to a second client device such that, based on the cookie, connections to the application from the second client device are routed to the given application instance.

18 Claims, 5 Drawing Sheets

(56) References Cited

OTHER PUBLICATIONS

Microsoft, "WSFC Quorum Modes and Voting Configuration (SQL Server)," Oct. 3, 2016, https://docs.microsoft.com/en-us/sql-server/failover-cluster/windows/wsfc-quorum-modes-and-voting-configuration-sql-server?view=sql-server-ver15.
Mozilla, "HTTP Cookies," Dec. 24, 2019, https://developer.mozilla.org/en-US/docs/Web/HTTP/Cookies.
Amazon Web Services, Inc., "Configure Sticky Sessions for Your Classic Load Balancer", available online at <https://web.archive.org/web/20191104214531/https://docs.aws.amazon.com/elasticloadbalancing/latest/classic/elb-sticky-sessions.html>, Nov. 4, 2019, 7 pages.

* cited by examiner

CONNECTING APPLICATION INSTANCES TO CLIENT DEVICES

BACKGROUND

Computing devices may receive any number of services remotely. For example, an application service provider may provide any number of services over the internet. These services may include access to particular remote software applications. Because application services may be delivered to any number of computing devices in any number of locations, an application may take the form of multiple instances.

BRIEF DESCRIPTION OF THE DRAWINGS

Certain examples are described in the following detailed description and in reference to the drawings, in which.

DETAILED DESCRIPTION OF SPECIFIC EXAMPLES

Figure 1:
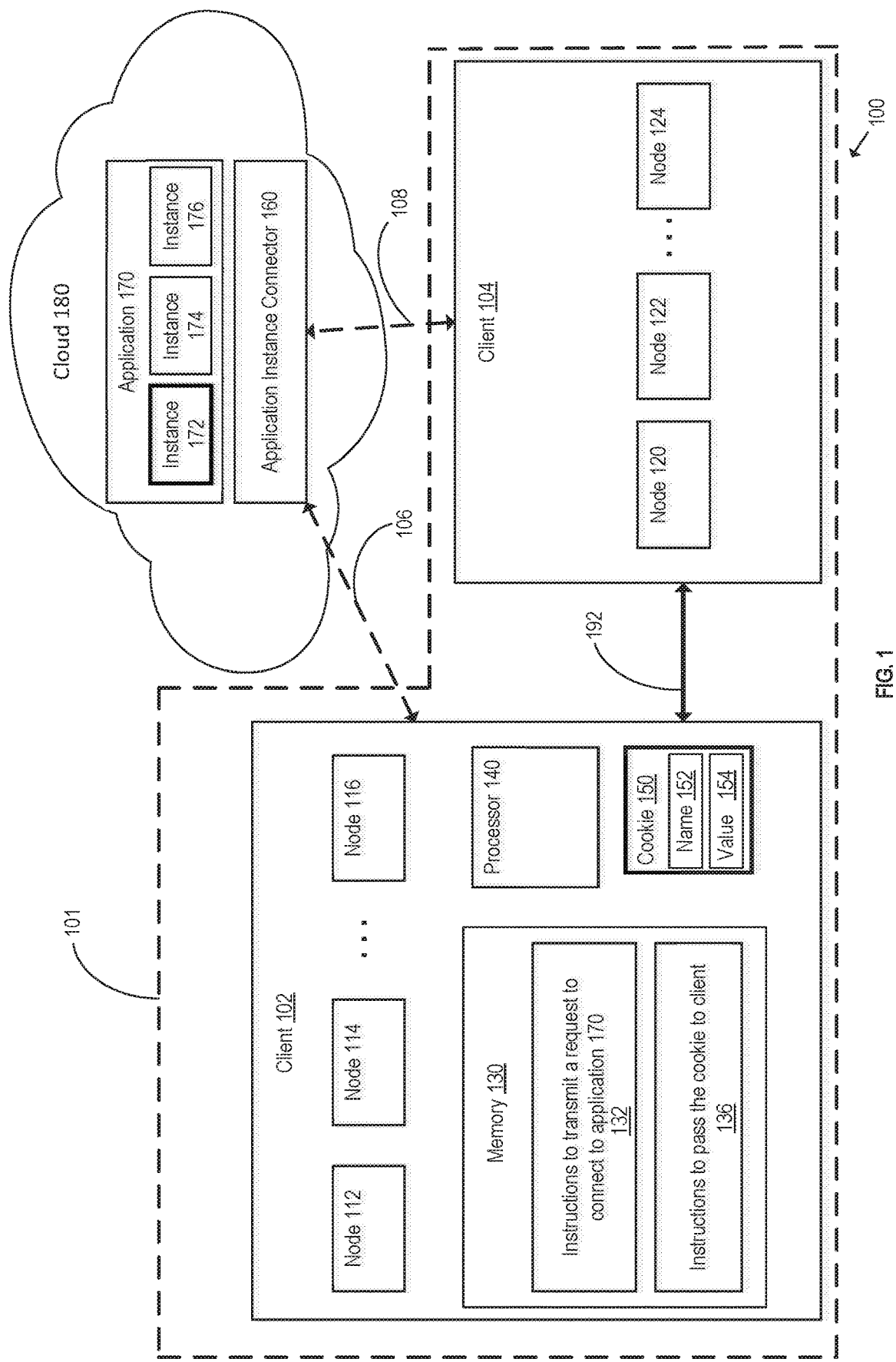
FIG. 1 is a block diagram illustrating a system for connecting a group of client devices to a like application instance.

Cloud based computing is the remote delivery of computing services over a network. Cloud computing generally involves a third party providing remote resources, e.g. access to applications; compute, storage, or networking resources; and/or platforms; to a computing device "as-a-service" over the internet. A resource, application, or service may be considered "cloud-based" where it is located at one or more remote servers and delivered over a network. These resources may be spread across multiple devices and/or multiple locations.

As described above, these resources may include access to cloud-based applications. Cloud-based applications may be implemented by one or more application instances that may run concurrently on the remote computing system. These application instances may run in isolation, that is, the application instances do not communicate with each other directly. An application may be a software entity that runs on hardware and provides or otherwise fulfills a service, and an application instance may be a particular occurrence of that entity.

A client device may be a computing device that includes computer hardware or a combination of hardware and software that accesses a service, such as a cloud-based service. A group, also referred to herein as a cluster, of client devices may perform joint cluster operations. Specifically, client devices may be peers in an environment, and may share state information to perform a joint operation. For example, a group of client devices may include a primary storage array and a secondary storage array performing replication of data stored at the primary storage array to the secondary storage array. The primary and secondary storage arrays may share state information such that, if the primary storage array were to become unavailable, the secondary storage array may takeover.

Another example of client devices performing joint cluster operations may include weather statistics endpoints or other hardware that may share state information across distinct locations to produce an insight. As another example, multiple client devices may connect to a like browser client. A set of multiple connections from one or more clients may be referred to as a "client session." For instance, a first connection may include a browser client adding a first item to a virtual shopping cart on an e-commerce website, and a second connection may include a second browser client adding a second item to the virtual shopping cart. To ensure that each of the first and second items are added to the same virtual shopping cart, state information of the first and second client connection may be shared with the browser client.

A group of client devices that perform cluster-type operations may utilize cloud-based applications. However, to ensure the group of client devices share state information, the group of client devices may be connected to a like application instance, or, different application instances connected to the group of client devices respectively may share state information.

Because, as described above, application instances may not be in direct communication with each other, application instances may synchronize and/or coordinate state information via a backend database service that is accessible by each running instance of the application. Like the application instances, the backend database service may be a cloud-based service. The backend database service, for example, may store the state information of each of the group of client devices and may pass the state information to each running application instance connected to at least one of the group of client devices.

To ensure security, locking and control mechanisms may be implemented at the application to prevent shared access to the backend database service. Additionally, a third party offering the locking and control mechanisms as-a-service or the backend database as-a-service may charge an end user for the consumption of these services, or for a license to access these services. The cost and complexity of relying on a backend database service may be avoided by ensuring that the clients of a client group performing cluster-based operations connect to a same instance of an application.

FIG. 1 is a block diagram illustrating a system for connecting a group of client devices to a like application instance. This illustrated example includes a group of clients 101 including two example client devices, 102 and 104 respectively. While two example client devices are illustrated in group of client devices 101 for purposes of clarity and conciseness, group of client devices 101 may include any number of client devices.

Client device 102 and/or client device 104 may include computer hardware or a combination of hardware and software. In an example, client device 102 and/or client device 104 may be a storage array including any number of nodes, 112-116 and 120-124 respectively, for facilitating the storage of data. Client device 102 may include hardware (not shown) for connecting 106 to a network. Client device 104 may similarly include hardware (not shown) for connecting 108 to the network. In an example implementation, client devices 102 and 104 may specifically access cloud-based resources illustrated at cloud 180 via connection 106 and/or connection 108 respectively.

In this illustrated example, the cloud-based resources of cloud 180 may include a cloud-based application 170 implemented by instances 172-176. While a single application 170 and three example instances 172-176 are illustrated for purposes of clarity and conciseness, cloud 180 may include any number of applications implemented by any number of application instances. Furthermore, the number of application instances of application 170 may be dynamic, and may scale up or down depending on a number of requests for service of application 170.

Client device 102 may include a memory 130 storing instructions 132-136, and a processor 140 for executing the instructions of memory 130. Processor 140 may represent any number of physical processors capable of executing instructions stored at memory 130. Furthermore, processor 140 (and any other processor described herein) may be implemented by any number of processing resources (e.g., processor(s), processor core(s), etc.). While processor 140 is illustrated as local to client device 102, processor 140 may execute instructions of memory 130 remotely, and may be spread among any number of devices.

Client device 102 may include instructions 132 to request a service. Specifically, instructions 132 may cause client device 102 to transmit a request, e.g. via connection 106, to cloud 180 for connection to an application service. In examples described herein, a connection from a client device to an application may be an indirect connection facilitated by the application instance connector 160. For instance, instructions 170 may specifically cause client device 102 to connect to application instance connector 160 to connect to the application.

Application instance connector 160, responsive to the request of client device 102 to connect to application 170, may select an application instance, e.g. application instance 172, of application 170 for client device 102 to connect to. Application instance connector 160 may be located remotely and accessed over a network as illustrated in this example. In another example implementation, instance connector 160 may be local to client group 101 or client device 102. Application instance connector may be, for example, a load balancer implementing any number of load balancing policies and/or protocols for distributing client connections among running application instances.

Application instance connector 160 may select an application instance to which client device 102 is to be connected and may transmit a cookie 150 to client device 102 responsive to the selection. Cookie 150 may direct or otherwise map a client device holding cookie 150 to an application instance to which cookie 150 is associated. In this illustrated example, cookie 150 may direct or otherwise map client device 102 to application instance 172. In an example, any data transmitted by client device 102 to the application while client device 102 is holding cookie 150 is routed to application instance 172. In an example implementation, cookie 150 may include a name 152, and/or a value 154. Cookie name 152 may identify the cookie, while value 154 may be a globally unique number or string of characters that identifies a set of related client connections.

For example, while holding cookie 150, client device 102 may transmit a request to application instance connector 160 to connect to application 170. Responsive to the request, application instance connector 160 may scan for the presence of cookie 150. For instance, application instance connector 160 may check for the presence of cookie 150 in HTTP headers of a client session (not shown). In another example, application instance connector 160 may search for a cookie held by client device 102 and provided by application instance connector 160 and/or associated with application 170. For example, application instance connector 160 may search for a cookie previously provided by application instance connector 160 from a previous connection between client device 102 and application instance connector 160 via name 152.

In another example, application instance connector 160 may search for a cookie associated with an instance of application 170. In this example, the application instance for which cookie 150 is associated may be determined by application instance connector 160 from value 154. Responsive to determining that client device 102 holds a cookie associated with application 170, application instance connector 160 may connect client device 102 to any of application instances 172-176. In this illustrated example, cookie 150 may be associated with application instance 172 such that application instance connector 160, responsive to determining that client device 102 holds cookie 150, may direct client device 102 to connect to application instance 172. Accordingly, client device 102, holding cookie 150, may be mapped or otherwise routed to a particular application instance, e.g. application instance 172, responsive to instructions 132.

Memory 130 of client device 102 may further include instructions to pass cookie 150 to client device 104. In an example implementation, client device 102 may pass cookie 150 to client device 104, and/or any other clients of client group 101 performing cluster-based operations with client device 102, responsive to receiving cookie 150 from application instance connector 160. In an example implementation, client device 102 may pass cookie 150 to client device 104 via an alternate pathway that is different from that used to establish the connection between client device 102 and application instance connection 160.

Client device 102, may for example, pass cookie 150 to client device 104 across the alternate pathway, e.g. private communication link 192. The alternate communication pathway may be a communication channel that is independent from, and/or otherwise inaccessible by cloud 180. In other examples, cookie 150 may be transmitted by client device 102 across a secure trusted channel between client device 102 and client device 104. Communication link 192 may be, for example, a remote copy data link, such as a fiber channel link or an Ethernet network link between client device 102 and client device 104, a Remote Direct Memory Access (RDMA) fabric, and/or any other client-to-client communication pathway for sharing the cookie.

Client device 104 may receive cookie 150 from client device 102. Because cookie 150 may map the holder of cookie 150 to a particular application instance, client device 104, when requesting a connection with application 170, may also be connected to application instance 172 via application instance connector 160. Thus, client device 102 and client device 104 may be mapped to the same application instance. In an example, the mapping of client device 102 and client device 104 to application instance 172 enables application instance 172 to maintain state information of both client device 102 and client device 104. Accordingly, client devices of client group 101, i.e. client devices conducting joint cluster operations, may be mapped to a like application instance to ensure state information relevant to these joint cluster operations is synchronized and/or otherwise coordinated.

An example of an application 170 that may synchronize and otherwise coordinates state information of multiple client devices may be an application that provides a quorum witness service. A quorum witness may be a protocol and/or configuration to ensure the role and/or functionality of a client device acting in conjunction with other client devices to perform joint cluster operations is properly assigned. As described above, a plurality of client devices in communication with each other via a network may interact with one another to perform joint cluster operations. These operations may include, for example, data replication.

Referring to FIG. 1, client device 102 may be assigned, or otherwise may be configured to hold the role of "group leader." A client device having this role may perform various functionalities for the group (which may be referred to as "group services" herein), such as management services like, for example, Representational State Transfer (REST) application programming interface (API) endpoint, a command line interface (CLI) endpoint, or the like.

In some examples, a client device having the group leader role may also maintain an authoritative record of metadata for the group or cluster (e.g., in a database). For example, when the client devices include storage arrays in replication relationships to replicate the contents of various volumes to one another, the client device having the group leader role may maintain an authoritative record of the client devices (e.g., storage arrays) in the group, information about those client devices (e.g., internet protocol (IP) addresses, etc.), and information about replication relationships in the group, such as information on each volume stored by the storage arrays and the replication relationships between the volumes of the arrays. For example, this information may specify, for each volume, which storage array owns the upstream (or source) version of the volume, which storage array stores a downstream (or destination) version of the volume (to receive replication of data from the upstream version), what replication pool each volume is assigned to, etc.

In such examples, it may be desirable to promote another client device of the group to a "backup group leader" role for the group so that the client device with the backup group leader role (which may be referred to herein as the "backup group leader") may take over the group leader role if the current client device having the group leader role (which may be referred to herein as the "group leader") experiences issue(s) that may prevent it from successfully performing the group leader role, such as a failure, a loss of communication with other client device(s), a restart, a shutdown, or the like. In this example, client device 104 may be assigned or otherwise configured to hold the role of "backup group leader."

In such examples, client device 104, as backup group leader, may assume the group leader role of client device 102 when it detects an issue with client device 102 (e.g., an apparent failure of client device 102). However, if client device 102 has not actually failed, or if client device 102 recovers after resolution of a temporary issue, for example, there is potential for a so-called "split brain" scenario, in which multiple client devices may claim to be the group leader. For example, such a split brain situation may occur when "group leader" client device 102 (which has not failed or has recovered from a prior issue) claims to be the group leader, and the existing backup group leader client device 104 (which attempts to assume the group leader role on the assumption that client device 102 has failed) also claims to be the group leader. Such a split brain scenario may be detrimental, as two different client devices may assert to have the authoritative view of the information about group 101 (e.g., about the client devices and replication relationships, etc.), which may diverge over time, and both may attempt to provide the above-described group services to group 101.

In some examples, group state information may be stored on one of the client devices of a client device group and used by a quorum witness. In such examples, the tiebreaker information may include information about the group, such as an identification of which client device of the group is to have the group leader role. In such examples, this tiebreaker information may be used to avoid split brain situations where the existing group leader and the backup group leader might otherwise both attempt to assume the group leader role, by indicating to both which client device among them is permitted to be the group leader at the present time.

However, storing such tiebreaker information on a client device that is a member of the group may have a major disadvantage, since unavailability (e.g., failure) of the computing device storing the tiebreaker information would also lead to unavailability of the tiebreaker information.

To avoid this disadvantage, the storage of group state information, and the quorum witness may be remote to client devices of the client device group, e.g. group 101, and may be in communication with client device group 101 over a network. For example, the quorum witness may be included in application 170 of cloud 180, and may be offered as-a-service to client device group 101. For instance, a cloud provider may offer a quorum witness application as-a-service to client devices conducting joint cluster operations. To support multiple independent client devices groups across multiple end users, multiple instances of quorum witness application may be spun up, or otherwise configured. Furthermore, network-layer load balancing techniques may be employed, e.g. by application instance connector 160, to distribute new client connections to running instances, e.g. instances 172-176, of application 170.

The direct passage of a cookie, e.g. cookie 150, between client devices conducting joint cluster operations, may ensure that these client devices are connected to a like application instance, e.g. application instance 172. The like application instance may collect state information from each of these client devices to perform quorum witness arbitration as described above.

Figure 2:
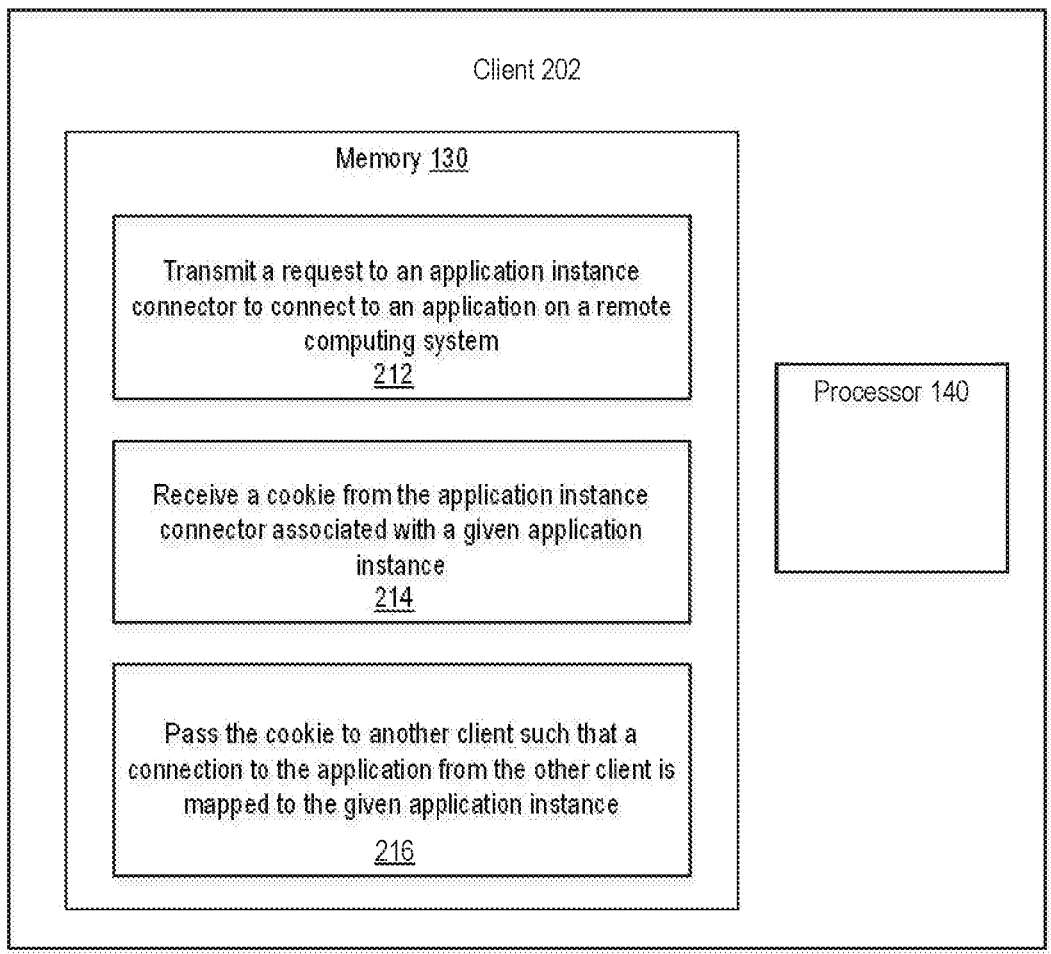
FIG. 2 is a block diagram illustrating a client device having instructions for passing a cookie to another client device such that both client devices are mapped to a like application instance.

FIG. 2 is a block diagram 200 illustrating a client device 202 having instructions 212-216 for passing a cookie to another client device of a client device group. Client device 202, as described above, may be a computing device that includes computer hardware or a combination of hardware and software that accesses a service, such as a cloud-based service. Client device 202 may be one of a group of client devices that may perform joint cluster operations. Client device 202 may further include similar components to those described above at FIG. 1, including memory 130 and processor 140.

Memory 130 of client device 202 may include instructions 212-216 executable by processor 140. Memory 130, may, for example, include instructions 212 to transmit a request to an application instance connector to connect to an application on a remote computing system. For example, referring to FIG. 1, client device 202 may transmit a request to connect to application instance connector 160 to connect to application 170 of cloud 180.

Memory 130 may further include instructions 214 to receive a cookie from the application instance connector associated with a given application instance. For example, client device 202 may receive a cookie from application instance connector 160 to connect to any of running application instances 172-176. Specifically, the received cookie may map connections to application 170 from client device 202 to an application instance associated with the cookie.

For example, application instance connector 160, responsive to the request of client device 202 to connect to application 170, may determine whether client device 202 holds a cookie associated with a running application instance of application 170. A positive determination may lead to the application instance connector 160 connecting client device 202 to the application instance associated with the cookie held by client device 202. Conversely, a negative determination may cause application instance connector 160 to select an application instance of application 170 for client device 102 to connect to, and may transmit the cookie to client device 202.

Memory 130 may also include instructions 216 to pass the cookie from client device 202 to another client device that shares joint operations with client device 202, and specifically, joint operations associated with a service provided by application 170. The passing of the cookie from client device 202 to the other client device may cause both client devices to map to a like application instance associated with the joint operations of the client devices.

Instructions 216, may for example, cause client device 202 to pass the cookie to another client device across a pre-established private communication link. The private communication link may be a communication channel that is independent from a public or outside network. Put another way, the cookie may be transmitted by client device 202 across a secure trusted channel between client device 202 and the client device receiving the cookie.

Figure 3:
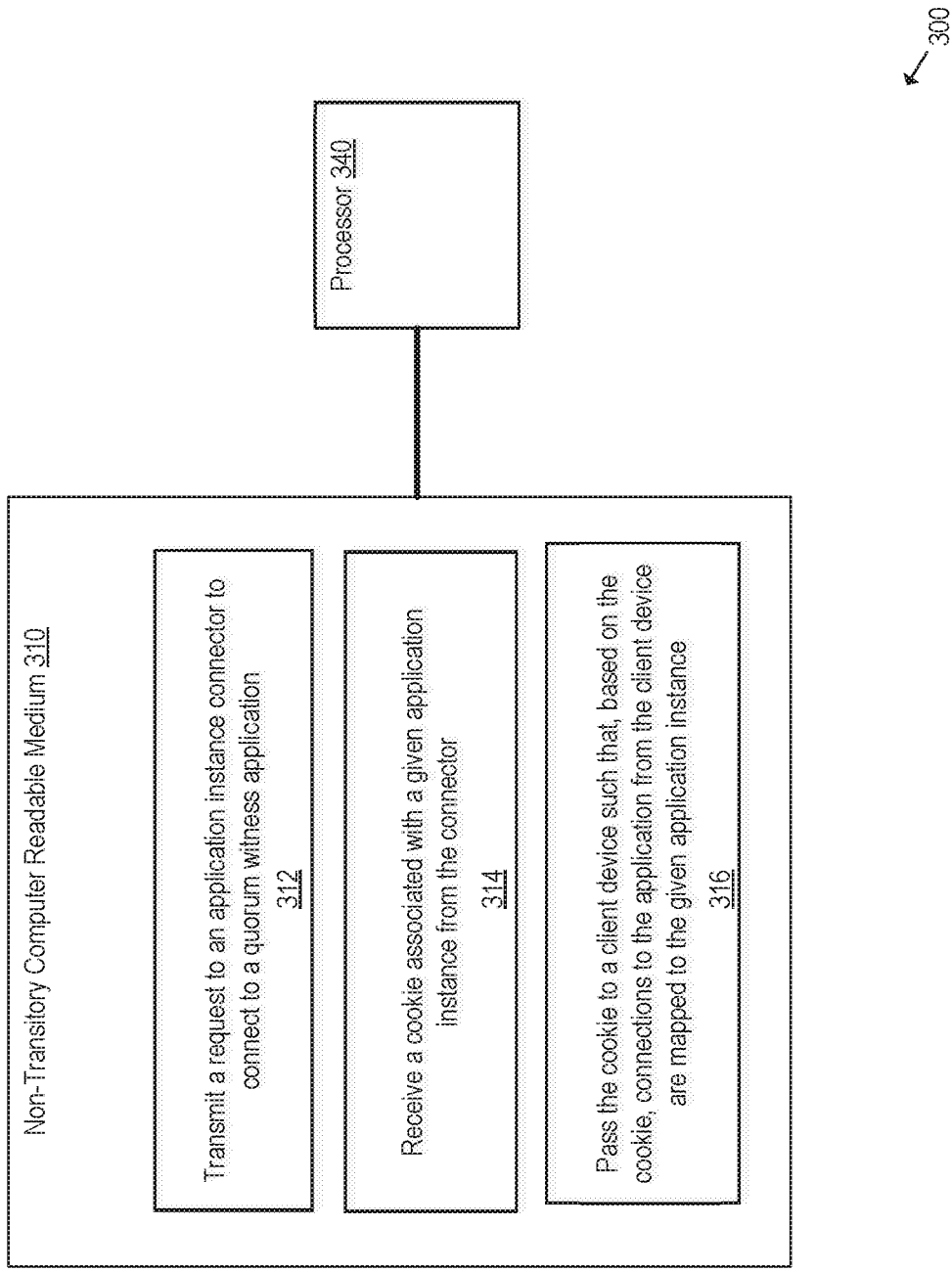
FIG. 3 is a block diagram illustrating a non-transitory computer readable medium including processor executable instructions for passing a cookie between client devices such that both client devices are mapped to a like application instance.

FIG. 3 is a block diagram 300 illustrating a non-transitory computer readable medium 310 including processor executable instructions 312-316 for passing a cookie from a first client device to a second client device such that both client devices are mapped to a like given application instance. Non-transitory computer readable medium 310 may be implemented in a single device or distributed across devices. Likewise, processor 340 may represent any number of physical processors capable of executing instructions stored by computer readable medium 310.

As used herein, a "computer readable medium" may be any electronic, magnetic, optical, or other physical storage apparatus to contain or store information such as executable instructions, data, and the like. For example, any computer readable medium described herein may be any of RAM, EEPROM, volatile memory, non-volatile memory, flash memory, a storage drive (e.g., an HDD, an SSD), any type of storage disc (e.g., a compact disc, a DVD, etc.), or the like, or a combination thereof. Further, any computer readable medium described herein may be non-transitory. In examples described herein, a computer readable medium or media may be part of an article (or article of manufacture). An article or article of manufacture may refer to any manufactured single component or multiple components.

Processor 340 may be a central processing unit (CPU), graphics processing unit (GPU), microprocessor, and/or other hardware device suitable for retrieval and execution of instructions stored in computer readable medium 310. Processor 340 may fetch, decode, and execute program instructions 312-316, and/or other instructions. Similarly, processor 340 may fetch, decode, and execute program instructions 312-316. As an alternative or in addition to retrieving and executing instructions, processor 340 may include at least one electronic circuit comprising a number of electronic components for performing the functionality of instructions 312-316, and/or other instructions. Similarly, processor 340 may include at least one electronic circuit comprising a number of electronic components for performing the functionality of instructions 312-316, and/or other instructions.

Computer readable medium 310 may include instructions 312-316, the instructions executable by processor 340. Computer readable medium 310, may, for example, include instructions 312 to transmit a request, across a network, to an application instance connector to connect to a quorum witness application implemented by multiple application instances.

Computer readable medium 310 may further include instructions 314 to receive a cookie from the application instance connector. The received cookie, may, for example, be associated with a given application instance of the quorum witness application. The received cookie, in some example instances, may map connections to the quorum witness application from a client device holding the cookie to an application instance associated with the cookie.

Computer readable medium 310 may also include instructions 316 to pass the cookie from the client device holding the cookie received from the application instance connector to another client device that shares joint operations with the client device holding the cookie. The passing of the cookie from the client device holding the cookie to the other client device may cause both client devices to map to a like application instance associated with the joint operations of the client devices.

In some example scenarios, client devices sharing joint operations may both receive a cookie from an application instance connector of a cloud and may seek to pass their respective cookie to the other client device. However, because the cookie held by each of the client devices may be associated with a different application instance, the holding of multiple cookies of a given application by a single client device may lead to a wrong mapping of client devices to application instances. In other words, each client device in this scenario may not transmit its respective state information to a like application instance.

Figure 4:
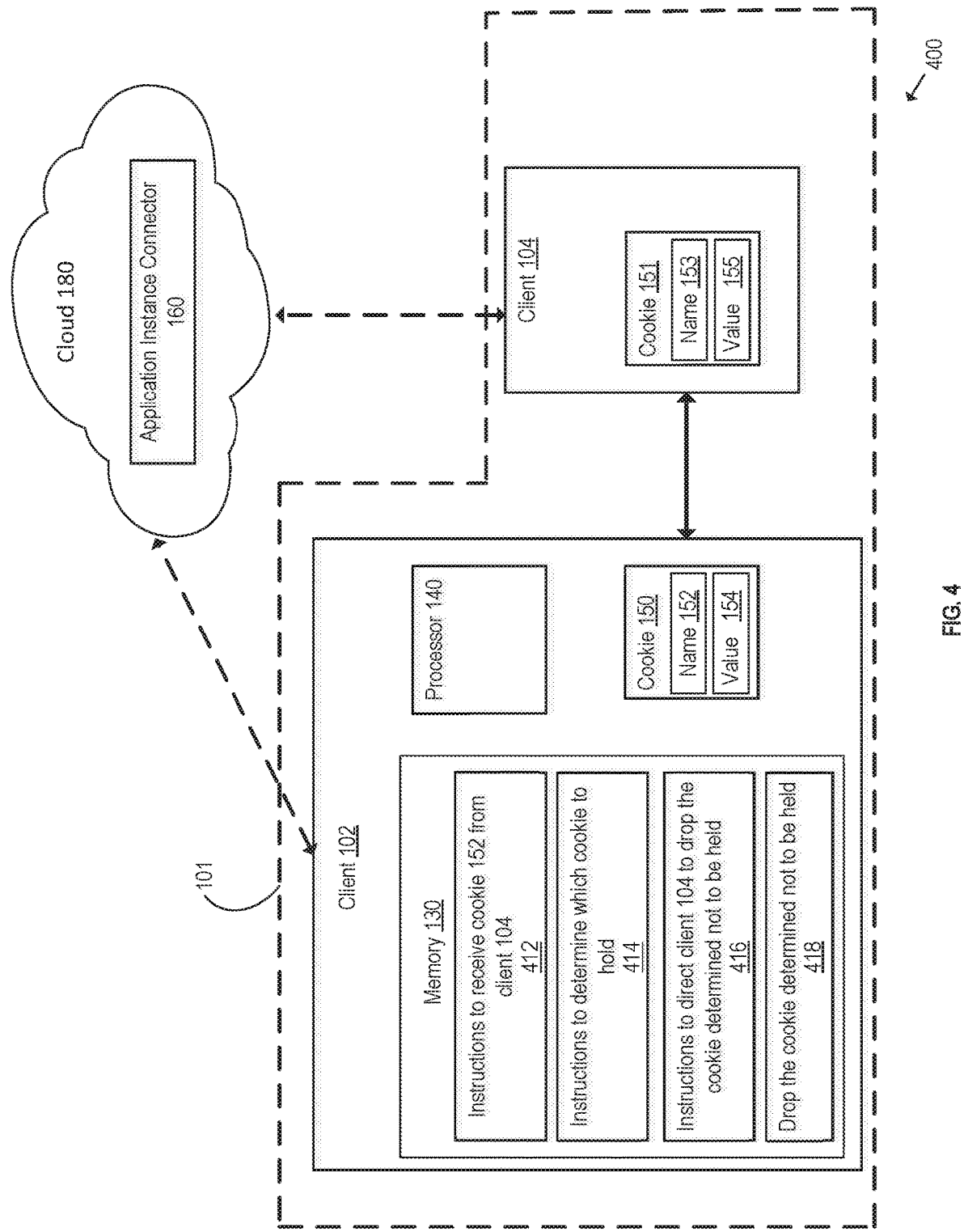
FIG. 4 is a block diagram illustrating a system for determining which cookie is to be shared between client devices of a client device group.

FIG. 4 is a block diagram illustrating a system 400 for determining which cookie is to be shared between client devices of a client device group in the event that the client devices receive multiple different cookies associated with different application instances of a given application. FIG. 4 may include a similar architecture to that described at FIG. 1, including cloud 180 having application instance connector 160, and client device group 101. FIG. 4 may further include client devices 102 and 104 of FIG. 1, client device having memory 130, processor 140, and cookie 150 as described in FIG. 1. Specifically, and as described above with respect to FIG. 1, client device 102 may receive cookie 150 from an application instance connector 160 of cloud 180.

In an example implementation, client device 104 may include similar instructions to those described above with respect to client device 102 of FIG. 1, and may transmit a request to application instance connector 160 of cloud 180 to connect to a remote application. Responsive to this request, client device 104 may receive a cookie, e.g. cookie 151, from application instance connector 160.

Client device 104 may further include similar instructions to those described above with respect to client device 102 of FIG. 1 to pass cookie 151 to client device 102. In this illustrated example, client device 102 may have already received cookie 150 as described above with respect for FIG. 1, from application instance connector 160. Client device 102, may receive cookie 151 from client device 104 according to instructions 412, and according to instructions 414, may determine which cookie to hold between cookie 150 and cookie 151.

In an example implementation, client device 102 may assess which cookie to hold by comparing values 154 and 155 of cookies 150 and 151 respectively. In an example, client device 102 may determine to hold the cookie having the lowest canonical value between value 154 and value 155. In another example, each of cookie 150 and 151 may be associated with a time stamp indicating when the cookie was transmitted from the application instance connector to client device 102 or client device 104 respectively. Client device 102 may, in some examples, determine to hold the cookie having the earliest time stamp between cookie 150 and cookie 151.

Responsive to determining which cookie to hold among cookie 150 and cookie 151, client device 102 may include instructions 416 to direct client device 104 to drop the cookie not determined to be held, and may otherwise pass cookie 150 to client device 104 to hold in lieu of cookie 151. Client device 102 may further include instructions 418 to drop the cookie not determined to be held. Accordingly, client device 102 and client device 104 may coordinate to hold a like cookie despite each receiving a different cookie from application instance connector 160.

Figure 5:
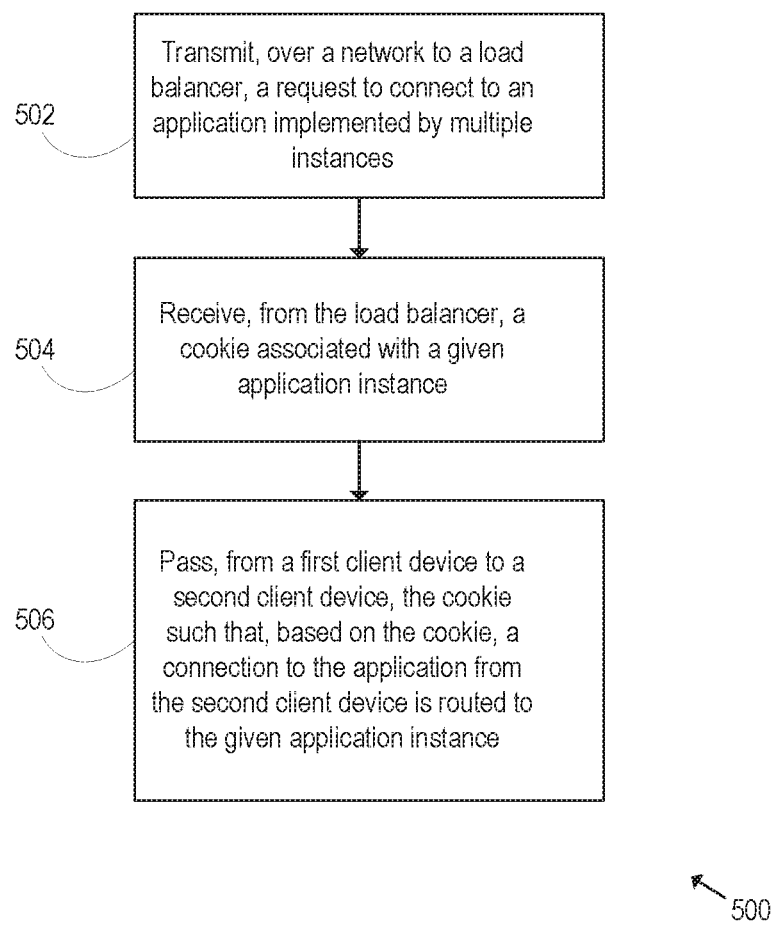
FIG. 5 is a flowchart illustrating a method for passing a cookie between client devices such that, based on the cookie, connections to an application from the receiving client device are routed to a particular application instance.

FIG. 5 is a flowchart 500 illustrating a method for passing a cookie between client devices such that, based on the cookie, connections to an application from the receiving client device are routed to a particular application instance. Although execution of method 500 is described below with reference to system 100 of FIG. 1, this is for explanatory purposes and other suitable components for execution of method 500 may be utilized. Method 500 may be implemented in the form of executable instructions stored on a machine-readable storage medium and/or in the form of electronic circuitry, e.g. hardware. In some examples, steps of method 500 may be executed substantially concurrently or in a different order than shown in FIG. 5. In some examples, method 500 may include more or less steps than are shown in FIG. 5. In some examples, some of the steps of method 500 may, at certain times, be ongoing and/or may repeat.

At block 502, a request may be transmitted over a network to an application instance connector, e.g. a load balancer, to connect to an application implemented by multiple instances. A connection from a client device to an application may be an indirect connection facilitated by the application instance connector. In an example implementation, the multiple instances of the application may be on a remote computing system, and any number of the multiple instances may be spread across remote devices, physical and/or virtual locations, data centers, etc.

At block 504, a cookie associated with a given application instance of the multiple instances may be received by the load balancer. The cookie may, for example, cause a connection to the application from client devices having the cookie to map to the given application instance. For example, responsive to the request to connect to the application, the load balancer may determine whether the requestor holds a cookie associated with one of the multiple instances of the application. A positive determination may lead to the application instance connector connecting the cookie holder to the application instance associated with the cookie. Conversely, a negative determination may cause application instance connector to create an application instance of the multiple instances and a cookie associated with the instance. The application instance connector may then transmit the created cookie to the requestor.

At block 516, the cookie may be passed from the receiving device to a second device. For example, client device 102 may pass cookie 150 to client device 104. In some examples, the cookie may be passed across a private communication link, e.g. communication link 192 of FIG. 1, separate from that between the first client device and the application instance connector from which the cookie was initially received. In an example implementation, the cookie may be passed to the second device responsive to receiving the cookie from the application instance connector, e.g. application instance connector 160.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

The invention claimed is:

1. A first client device of a client device group, comprising:
a processor; and
memory including instructions that, when executed by the processor, cause the processor to:
transmit, to an application instance connector, a request to connect to a quorum witness application of a remote computing system in a cloud, the quorum witness application implemented by multiple application instances of the quorum witness application on the remote computing system;
receive, from the application instance connector, a cookie associated with a given application instance of the multiple application instances, wherein the cookie causes connections to the quorum witness application from client devices having the cookie to map to the same given application instance; and
pass the cookie from the first client device directly to a second client device of the client device group, such that, based on the cookie, connections to the quorum witness application from both the first client device and the second client device are mapped to the same given application instance,
wherein the first client device and the second client device are included among the client devices having the cookie, the client devices belonging to the client device group and being engaged in joint cluster operations of the client device group,
the given application instance maintains state information of the client devices having the cookie, and
the given application instance of the quorum witness application resolves a split-brain scenario for the client device group by determining from the state information which of the client devices is to hold a group leader role that maintains an authoritative record for the client device group.

2. The first client device of claim 1, wherein the first client device is a primary storage array storing data and the second client device is a storage array storing a replication of the data.

3. The first client device of claim 1, wherein the cookie is passed from the first client device to the second client device across a client-to-client communication link that is different and separate from a connection between the first client device and the application instance connector.

4. The first client device of claim 3, wherein the communication link on which the cookie is passed from the first client device to the second client device is a remote copy data link.

5. The first client device of claim 1, wherein the cookie is passed from the first client device to the second client device responsive to the first client device receiving the cookie from the application instance connector.

6. The first client device of claim 1, wherein client devices of the client device group holding the cookie are mapped to the given application instance such that any data transmitted to the quorum witness application by the client devices holding the cookie is routed to the same given application instance.

7. The first client device of claim 1, wherein
the state information is relevant to the joint cluster operations.

8. A method comprising:
transmitting, by a first client device of a client device group to a load balancer via a network, a request to connect to a quorum witness application, implemented by multiple application instances of the quorum witness application on at least one remote computing system in a cloud;
receiving, by the first client device and from the load balancer, a cookie associated with a given application instance of the multiple application instances, wherein the cookie causes connections to the quorum witness application from client devices having the cookie to map to the given application instance;
passing the cookie, by and from the first client device directly to a second client device of the client device group, such that, based on the cookie, connections to the quorum witness application from both the first client device and the second client device are routed to the same given application instance,
wherein the first client device and the second client device are included among the client devices having the cookie, the client devices belonging to the client device group and being engaged in joint cluster operations of the client device group,
the given application instance maintains state information of the client devices having the cookie, and
the given application instance of the quorum witness application resolves a split-brain scenario for the client device group by determining from the state information which of the client devices is to hold a group leader role that maintains an authoritative record for the client device group.

9. The method of claim 8, wherein the load balancer, responsive to receiving the request, creates the given application instance and the cookie.

10. The method of claim 8, wherein the cookie is passed from the first client device to the second client device responsive to the first client device receiving the cookie from the load balancer.

11. A non-transitory computer readable medium comprising instructions that, when executed by a processor of a first client device of a client device group, causes the processor to:
transmit, to an application instance connector and across a network, a request to connect to a quorum witness application in a cloud, wherein the quorum witness application is implemented by multiple application instances of the quorum witness application;
receive, by the first client device and from the application instance connector, a first cookie associated with a given application instance of the multiple application instances, wherein the first cookie causes connections to the quorum witness application from client devices holding the first cookie to map to the same given application instance; and
pass the first cookie from the first client device directly to a second client device of the client device group, such that, based on the first cookie, connections to the quorum witness application from both the first client device and the second client device are mapped to the same given application instance,
wherein the first client device and the second client device are included among the client devices holding the first cookie, the client devices belonging to the client device group and being engaged in joint cluster operations of the client device group,
the given application instance maintains state information of the client devices holding the first cookie, and
the given application instance of the quorum witness application resolves a split-brain scenario for the client device group by determining from the state information which of the client devices is to hold a group leader role that maintains an authoritative record for the client device group.

12. The non-transitory computer readable medium of claim 11, wherein client devices holding the first cookie belong to the cluster device group and are mapped based on the first cookie to the given application instance such that any data transmitted to the quorum witness application by the client devices holding the first cookie is routed to the same given application instance.

13. The non-transitory computer readable medium of claim 11, further comprising instructions to:
receive, by the first client device from the second client device, a second cookie, wherein the second cookie causes connections to the quorum witness application from client devices holding the second cookie to map to another application instance of the multiple application instances different from the given application instance;
in response to the first client device already holding the first cookie upon receipt of the second cookie, determine which of the first cookie the or second cookie is a cookie to be held by the first client device and second client device; and
drop, by the first client device, whichever of the first cookie and the second cookie is not the cookie to be held.

14. The non-transitory computer readable medium of claim 13, wherein the cookie to be held is determined as whichever of the first cookie and the second cookie has a lowest value.

15. The non-transitory computer readable medium of claim 13, further comprising instructions to, responsive to determining that the first cookie is the cookie to be held, direct the second client device to drop the second cookie.

16. The non-transitory computer readable medium of claim 11, wherein the first cookie is passed to the second client device responsive to the first client device receiving the first cookie.

17. The method of claim 16, wherein the cookie is passed from the first client device to the second client device across a client-to-client communication link that is different and separate from a connection between the first client device and the load balancer.

18. The method of claim 8, wherein the quorum witness application is distributed such that the multiple application instances are spread across multiple physical devices.

* * * * *